(12) United States Patent
Velusamy et al.

(10) Patent No.: US 7,840,781 B1
(45) Date of Patent: Nov. 23, 2010

(54) CIRCUIT ARRANGEMENT FOR PROFILING A PROGRAMMABLE PROCESSOR CONNECTED VIA A UNI-DIRECTIONAL BUS

(75) Inventors: Sivakumar Velusamy, Los Gatos, CA (US); Navaneethan Sundaramoorthy, San Jose, CA (US); Raj Kumar Nagarajan, San Jose, CA (US); Satish R. Ganesan, Mountain View, CA (US)

(73) Assignee: Xilinx, Inc., San Jose, CA (US)

( * ) Notice: Subject to any disclaimer, the term of this patent is extended or adjusted under 35 U.S.C. 154(b) by 902 days.

(21) Appl. No.: 11/732,721

(22) Filed: Apr. 4, 2007

(51) Int. Cl.
*G06F 13/00* (2006.01)

(52) U.S. Cl. .......................... 712/34; 712/32

(58) Field of Classification Search ............... None
See application file for complete search history.

(56) References Cited

U.S. PATENT DOCUMENTS

| | | | | | |
|---|---|---|---|---|---|
| 6,073,233 | A | * | 6/2000 | Chapman | 713/1 |
| 6,611,891 | B1 | * | 8/2003 | Hewitt et al. | 710/306 |
| 6,834,365 | B2 | * | 12/2004 | Bardsley et al. | 714/45 |
| 7,003,699 | B2 | * | 2/2006 | Swaine et al. | 714/30 |
| 7,007,201 | B1 | * | 2/2006 | Byrne et al. | 714/27 |
| 7,590,911 | B1 | * | 9/2009 | Azimi et al. | 714/733 |
| 7,640,472 | B2 | * | 12/2009 | Laschinsky et al. | 714/724 |
| 2004/0170169 | A1 | * | 9/2004 | Swoboda et al. | 370/389 |
| 2004/0250164 | A1 | * | 12/2004 | Ahmad et al. | 714/30 |
| 2005/0268177 | A1 | * | 12/2005 | John | 714/47 |
| 2006/0256877 | A1 | * | 11/2006 | Szczepanek et al. | 375/246 |

OTHER PUBLICATIONS

Xilinx, Inc., "ChipScope Pro Serial IO Toolkit", Apr. 2, 2007, 1 page, available from Xilinx, Inc., 2100 Logic Drive, San Jose, CA 95124 or http://www.xilinx.com/ise/optional_prod/cspro_siokit.htm.

Xilinx, Inc., "ChipScope Pro 9.1i Capabilities", Apr. 2, 2007, 4 pages, available from Xilinx, Inc., 2100 Logic Drive, San Jose, CA 95124.

Ziles, Craig B. et al., "A Programmable Co-Processor for Profiling", 7th Int'l Symposium on High Performance Computer Architecture, Jan. 19, 2001, 12 pages, available from Computer Sciences Department, University of Wisconsin—Madison, 1210 West Dayton Street, Madison, WI 43706-1685.

(Continued)

*Primary Examiner*—Eric Coleman
(74) *Attorney, Agent, or Firm*—LeRoy D. Maunu (57) ABSTRACT

Various approaches for profiling a target system are described. In one approach, a uni-directional, point-to-point bus has a single input port and a single output port. A target processor has a trace port coupled to the input port of the bus and is configured to execute a plurality of instructions one or more times. The target processor provides state data at the trace port and to the input port of the bus. A profile circuit arrangement is coupled to the output port of the first bus, and a memory is coupled to the profile circuit arrangement. The profile circuit arrangement is configured to read data from the output port of the first bus and write the data to the memory.

15 Claims, 4 Drawing Sheets

OTHER PUBLICATIONS

Anderson, Jennifer M. et al., "Continuous Profiling: Where Have All the Cycles Gone?", SRC Technical Note, Jul. 28, 1997, modified Sep. 3, 1997, 20 pages, available from Systems Research Center, 130 Lytton Avenue, Palo Alto, CA 94301.

Njoroge, Njuguna, "Statistical Profiler for Embedded IBM PowerPC", XAPP545, Sep. 15, 2004, 7 pages, v1.0, available from Xilinx, Inc., 2100 Logic Drive, San Jose, CA 95124.

Dean, Jeffrey et al., "ProfileMe: Hardware Support for Instruction-Level Profiling on Out-of Order-Processors", Micron-30, Dec. 1, 1997, 8 pages, available from IEEE, 445 Hoes Lane, P.O. Box 1331, Piscataway, NJ 08855-1331.

IBM, "RISCWatch Debugger" User Manual, Fifteenth Edition, May 2003, 374 pages, available from IBM Corporation, 1 New Orchard Road, Armonk, New York, 10504-1722 or at http://www-306.ibm.com/chips/techlib/techlib.nsf/techdocs/8A70ED3C8215AC5E872569D90050295E.

Jenkins, IV, Jesse H., "Methods and Circuits for Realizing a Performance Monitor for a Processor from Programmable Logic" U.S. Appl. No. 10/402,057, filed Mar. 27, 2003, 23 pages, available from Xilinx, Inc., 2100 Logic Drive, San Jose, CA 95124.

Graham, Susan L., *grof: a Call Graph Execution Profiler*, 1982, pp. PSD:18-1 to PSD:18-9, University of California Berkeley, Electrical Engineeing and Computer Science Department, Computer Science Division, Berkeley, California, USA.

\* cited by examiner

CIRCUIT ARRANGEMENT FOR PROFILING A PROGRAMMABLE PROCESSOR CONNECTED VIA A UNI-DIRECTIONAL BUS

FIELD OF THE INVENTION

The present invention generally relates to profiling activities of a processor.

BACKGROUND

Profiling of systems is often used to identify performance bottlenecks and to debug software. Generally, profiling refers to gathering data during the execution of software on a target system. The gathered data may include, for example, sampled program counter (PC) values, cache activity, bus activity and other general trace information. Once gathered, the data may be analyzed.

In one approach, the profiling software executes on the target processor along with the software targeted for profiling. Since the profiling software executes on the same processor targeted for profiling, the profiling software will influence behavior of the target processor and may do so in a manner that skews performance of the target processor.

In another approach, the profiling software executes on a co-processor to the target processor. By executing profiling programs on the co-processor, issues of skewed performance of the target processor may be avoided. However, the target processor may require modifications in order to tag instructions to be profiled, and making these modifications may be time consuming. Furthermore, memory shared between the target processor and the co-processor may skew performance of the target processor and make analysis difficult.

The present invention may address one or more of the above issues.

SUMMARY OF THE INVENTION

The various embodiments of the invention support profiling a target system. In one embodiment, a uni-directional, point-to-point bus has a single input port and a single output port. A target processor has a trace port coupled to the input port of the bus and is configured to execute a plurality of instructions one or more times. The target processor provides state data at the trace port and to the input port of the bus. A profile circuit arrangement is coupled to the output port of the first bus, and a memory is coupled to the profile circuit arrangement. The profile circuit arrangement is configured to read data from the output port of the first bus and write the data to the memory.

In another embodiment, a method for profiling a target processor is provided. The method includes configuring a field-programmable gate array (FPGA) with a target processor, a profile circuit arrangement, a first uni-directional, point-to-point bus having a single input port and a single output port, and a memory. The target processor has a first trace port coupled to the input port of the bus. The profile circuit arrangement is coupled to the output port of the bus and to the memory. A plurality of instructions are executed one or more times on the target processor, and the processor presents state data at the trace port as the instructions are executed. The state data is read from the first bus by the profile circuit arrangement and written to the memory.

In yet another embodiment, an apparatus is provided for profiling a target processor. The apparatus includes a plurality of uni-directional, point-to-point buses, each having a respective single input port and a respective single output port. The target processor has a plurality of trace ports coupled to respective input ports of the buses, is configured to execute a plurality of instructions one or more times, and provides state data of the target processor at the plurality of trace ports. The apparatus further comprises means for reading state data from the plurality of uni-directional, point-to-point buses and means for storing state data read from the buses.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

The various embodiments of the invention provide a programmable yet non-intrusive approach for profiling a programmable target processor. The approach is non-intrusive because the profiling arrangement neither interrupts nor displaces monitored processing of the target processor. Having no shared addressable memory between the target processor and the profiling arrangement further removes the profiling arrangement from impacting the target processor.

In one embodiment, the profiling arrangement includes a programmable processor that runs profiling software that may be customized to capture only the state data of the target processor desired for profiling. In addition, any signal from the target processor may be connected to the profiling arrangement, thereby providing a view of the entire system which is typically not available in other profiling schemes.

Figure 1:
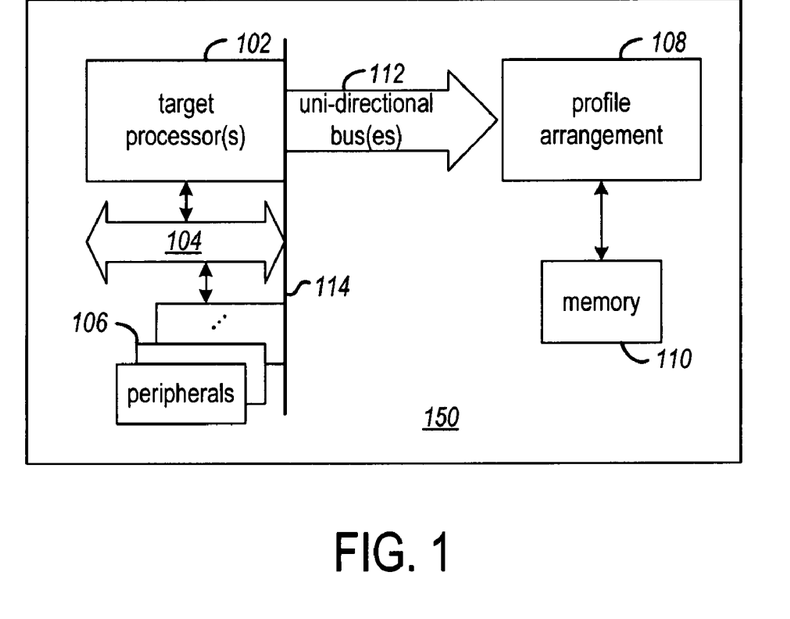
FIG. 1 is a block diagram that illustrates an example arrangement for profiling a system as it executes software in accordance with one or more embodiments of the invention.

FIG. 1 is a block diagram that illustrates an example arrangement for profiling a system as it executes software in accordance with one or more embodiments of the invention. The system targeted for profiling includes a target processor 102, a peripheral bus 104, and one or more peripheral components 106. The profile arrangement 108 is coupled to the target system, receives profile data from the target system, and logs the profile data to the memory 110. Since the target processor 102 does not execute code to perform the profiling functions, its performance is not adversely impacted. Similarly, since the memory 110 is not shared by the target processor and the profile arrangement, the target processor will not suffer from memory latency due to profiling activities.

The profiling arrangement uses available trace ports of the components of the targeted system in combination with uni-directional buses 112 to profile the target system without negatively impacting the performance. For example, one processor having available trace ports is the MicroBlaze™ processor architecture for field programmable gate arrays (FPGAs) from Xilinx, Inc. A MicroBlaze processor has trace ports available for the program counter register, cache status registers, and bus instruction registers, for example.

Each trace port may be connected to the input port of a Fast Simplex Link (FSL) uni-directional bus, and the output port of the FSL bus may be connected to the profile arrangement 108. The FSL bus may be implemented from a logic core available from Xilinx. Since the FSL bus provides a point-to-point connection there is no bus latency introduced in profiling the targeted system.

The profile arrangement may obtain profile data from any one of the components of the target system that makes the data available at a trace port. Multiple uni-directional buses may be used to obtain the profile data from the different sources. Line 114 represents the collection of trace ports from the processor 102, bus 104, and peripheral components 106.

In one embodiment, the profile arrangement may be implemented using a processor such as a MicroBlaze processor or a PicoBlaze processor, which is also available from Xilinx. Depending on the data desired for profiling and implementation restrictions, a single processor may gather profile data from one or more target processors via dedicated, respective uni-directional buses. The profile processor may be implemented on programmable logic of an FPGA, for example. Other embodiments may use multiple processors or multiple profiling cores to gather the desired data.

Bus 104 of the target system may be implemented using the On-chip Peripheral Bus (OPB) which is available from IBM Corp., and example peripherals 106 include device drivers and application-specific logic cores. In an example embodiment, the target system, uni-directional bus, and profile arrangement may all be implemented on an FPGA 150.

Figure 2:
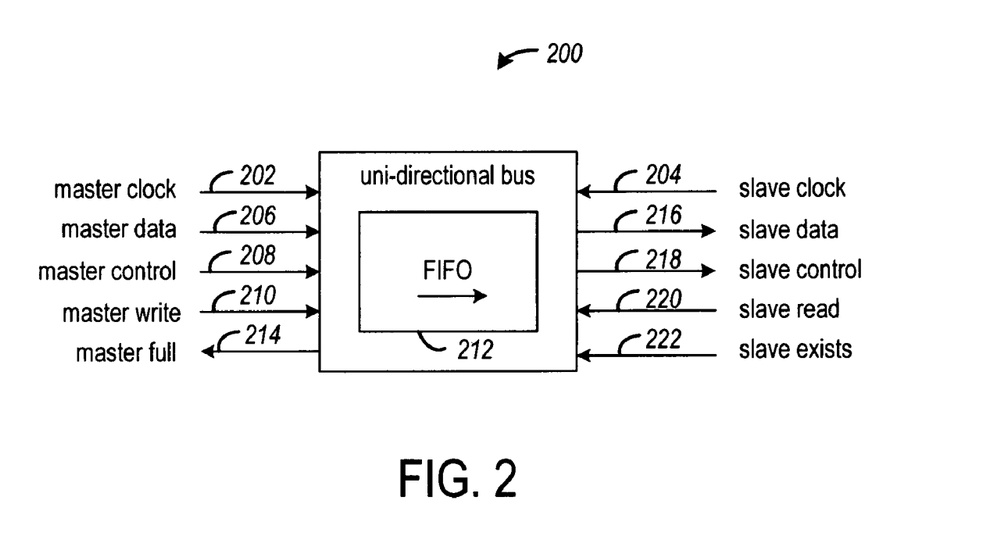
FIG. 2 is a block diagram of an example uni-directional bus that may be used to connect a target processor to a profiling arrangement.

FIG. 2 is a block diagram of an example uni-directional bus 200 that may be used to connect a target processor to a profiling arrangement. When implemented using the Xilinx FSL bus, the bus provides a uni-directional, point-to-point FIFO-based communication channel. The channel is not arbitrated and can be used for fast transfer of data words between the target processor and the profile arrangement.

The example uni-directional bus supports both synchronous and asynchronous FIFO modes. This allows the master and slave side of the FSL to clock at different rates. Thus, the target system may be clocked at a different speed from the profile arrangement. For a synchronous clocking, a single clock may be connected to both the master clock and slave clock pins.

For asynchronous operation, the target system provides the master clock signal on line 202, and the profile arrangement provides the slave clock signal on line 204. The profile data from a component in the target system is provided on the master data line 206, and a single control bit may be propagated along with the data on line 208.

The master write control signal on line 210 controls the write enable of the master interface of the FIFO 212. The state of the master write signal is customizable, which allows selection of sampled values. If all samples are desired, then the master write signal 210 is held high. Otherwise the write signal may be customized to go high every $n^{th}$ cycle, for example. The bus outputs a full signal to the master when the FIFO 212 is full of data. In the example embodiment the target system does not use the full signal for interrupting the flow of profile data. The size of the FIFO may be configured according to profiling requirements.

The slave clock signal on line 204 provides the input clock to the slave interface on the bus when the bus is operated in asynchronous mode. The data read from the FIFO 212 is output as slave data on line 216. A control bit may accompany the data as the slave control signal on line 218, but is unused for profile data.

The slave read signal on line 220 is used by the profile arrangement to control reading of data from the FIFO 212. The slave exists signal on line 222 indicates whether the FIFO 212 contains valid data (or is empty).

When the profiling arrangement uses a processor such as the MicroBlaze processor, use of a uni-directional bus such as the FSL bus for gathering profile data is convenient and efficient. The MicroBlaze processor has up to 8 input and 8 output FSL interfaces. The get instructions of the MicroBlaze processor may be used read a data word from the bus into a MicroBlaze register. It will be appreciated, however, that the profile arrangement would not use the instructions for putting data on the bus. Below is a brief overview of the FSL related instructions available in a MicroBlaze processor.

get, put: Blocking Read and Blocking Write of data to the FSL. The control signal is set to 0.
get, nput: Non-blocking Read and Non-blocking Write of data to the FSL. The control signal is set to 0.
cget, cput: Blocking Read and Blocking Write of data to the FSL. The control signal is set to 1.
ncget, ncput: Non-blocking Read and Non-blocking Write of words to the FSL. The control signal is set to 1

Figure 3:
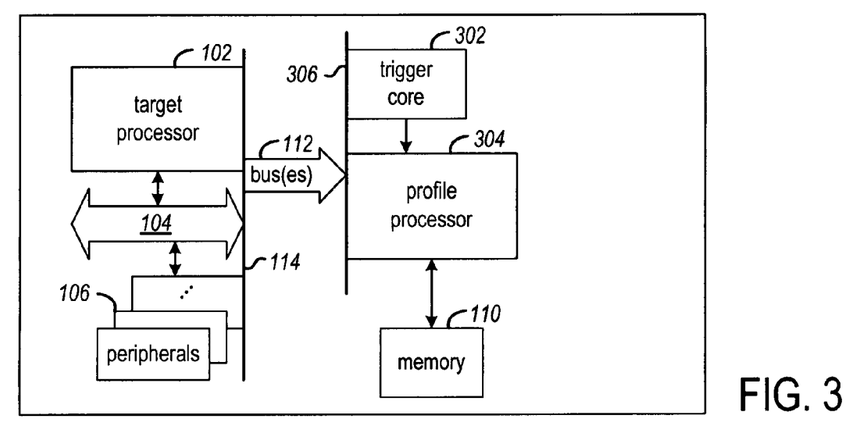
FIG. 3 is a block diagram of an example embodiment of a profiling arrangement having a profile processor and a trigger core.
Figure 4:
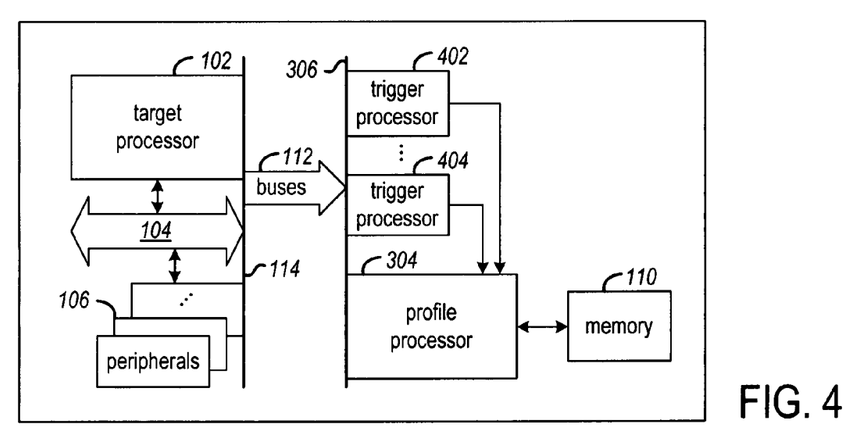
FIG. 4 is a block diagram of an example embodiment of a profiling arrangement having a profile processor and multiple trigger processors.
Figure 5:
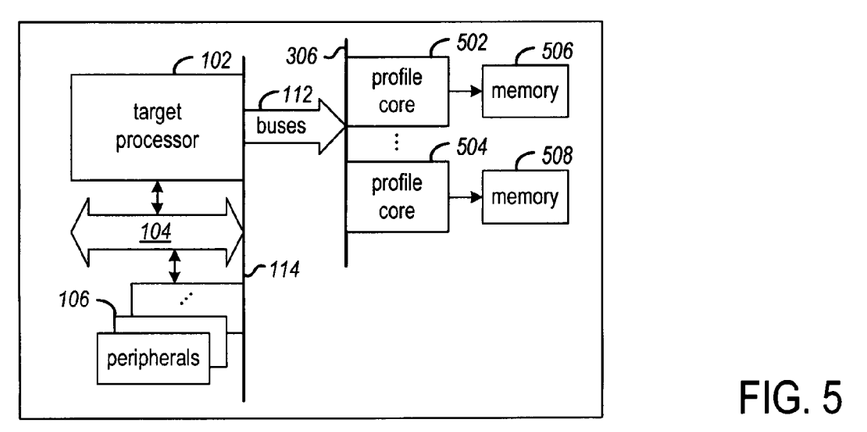
FIG. 5 is a block diagram of an example embodiment of a profiling arrangement having multiple profile cores.

The independent operation and different processing rates of the profile arrangement and the target system may result in uncaptured or undesired profile data. FIGS. 3, 4, and 5 illustrate different approaches for capturing the desired profile data. In one embodiment a trigger core is used to initiate gathering of profile data by a profile processor, in another embodiment, multiple trigger processors are used to trigger sampling in response to different detected trigger conditions, and in yet another embodiment, multiple profile core logic circuits may be used to capture profile data at different times.

FIG. 3 is a block diagram of an example embodiment of a profiling arrangement having a profile processor and a trigger core. The trigger core 302 is an implementation of a logic circuit design that generates an interrupt signal to the profile processor 304. The interrupt signal is generated in response to particular profile data received on one of the buses 112 that is connected to the trigger core. In response to the interrupt, the profile processor 304 reads profile data from the one (or more) of buses 112 that is connected to the processor and writes the data to the memory 108. Line 306 represents the collection of ports to which the bus(es) 306 are connected for the trigger core 302 and profile processor 304.

By initiating capture of profile data in response to the desired profile data being detected, the capture of unnecessary data may be avoided. The dedicated trigger core may operate faster than the profile processor in detecting the desired profile data, thereby initiating the capture the desired profile data sooner than if the profile processor monitored for a trigger condition.

FIG. 4 is a block diagram of an example embodiment of a profiling arrangement having a profile processor 304 and multiple trigger processors 402-404. Each of the multiple trigger processors generates an interrupt signal to the profile processor. Each trigger processor monitors the profile data appearing on a respective one of the buses 112. In response to particular data appearing on the connected bus, a trigger processor generates an interrupt to the processor 304. In processing the interrupt, the profile processor responds by reading profile data from the bus and writing the processed data to the memory.

The multiple trigger processors allow the monitoring of multiple conditions from different components in the target system. An interrupt based on any detected one of these conditions may then be used to trigger the profile processor to commence reading profile data from one or more uni-directional buses to which the profile processor is connected. Conditions in one component may trigger collection of profile data from the same or multiple other components.

FIG. 5 is a block diagram of an example embodiment of a profiling arrangement having multiple profile cores 502-504. Each profile core is coupled to a dedicated, respective memory 506-508, and each memory 506-508 has its own data and address ports. Each profile core is further connected to a respective one of buses 112, and each may be configured to read profile data from the bus at different times and write the data to the respective memory.

Since the target processor may present desired profile data at a rate that is faster than the rate at which a single profile processor is able to read, possibly process, and then store the profile data to memory, some of the profile data may go uncaptured. Thus, multiple profile cores may be used instead of a single processor. The buses to which the profile cores are connected may have inputs connected to the same trace port of the target system, or different ports depending on profiling objectives. Each of the profile cores may be implemented to read profile data from the respective bus at a different clock cycle. When multiple buses have inputs connected to the same trace port, and the profile cores read the bus outputs at different cycles, more of the desired profile data may be captured.

The memories 506 and 508 may be implemented as block RAM structures within an FPGA, for example.

Figure 6:
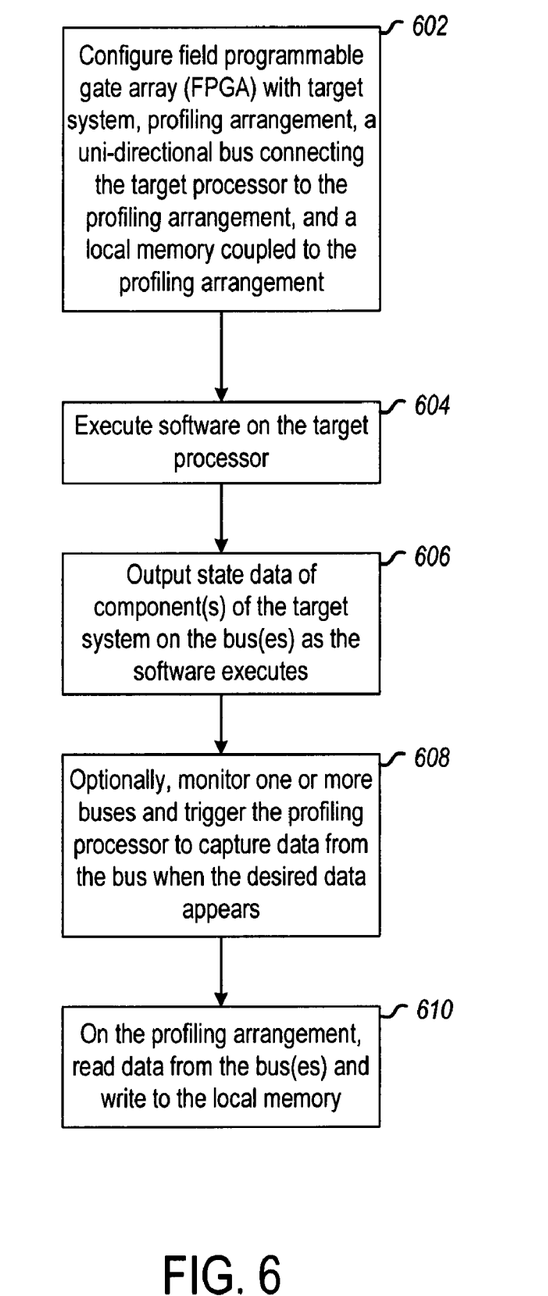
FIG. 6 is a flowchart of an example process for profiling software executing on a processor in accordance with one or more embodiments of the invention.

FIG. 6 is a flowchart of an example process for profiling software executing on a processor in accordance with one or more embodiments of the invention. In an example embodiment, an FPGA is configured with a target system that includes a processor, a bus, and one or more peripheral components coupled to the bus (step 602). The FPGA is also configured with a profiling arrangement and a memory to capture the profile data from the target system. One or more uni-directional buses connect one or more components of the target system to the profiling arrangement.

Once the FPGA is suitably configured, the desired software may be executed on the target system (step 604). The software may be provided from on or off the FPGA depending on user requirements.

As the software executes, the components of the target system present state data at the various trace ports, which are connected to one or more uni-directional buses. Each state value output by a component connected to a bus is captured by that bus (step 606).

The profile arrangement may be optionally triggered to commence collection of profile data based on profile data appearing on one or more of the uni-directional buses from one or more target system components (step 608). The triggering mechanism may be used to reduce the collection of undesired profile data.

The profiling arrangement reads profile data from the one or more uni-directional buses and writes the data to memory local to the profile arrangement. That is, the memory is not shared with the target system. If the profile arrangement is implemented with one or more processors, each processor will execute instructions for reading data from the connected bus and writing the data to the local memory. If the profile arrangement is implemented from profile core, the profile arrangement may read the profile data by way of direct application of a read signal to the bus.

Figure 7:
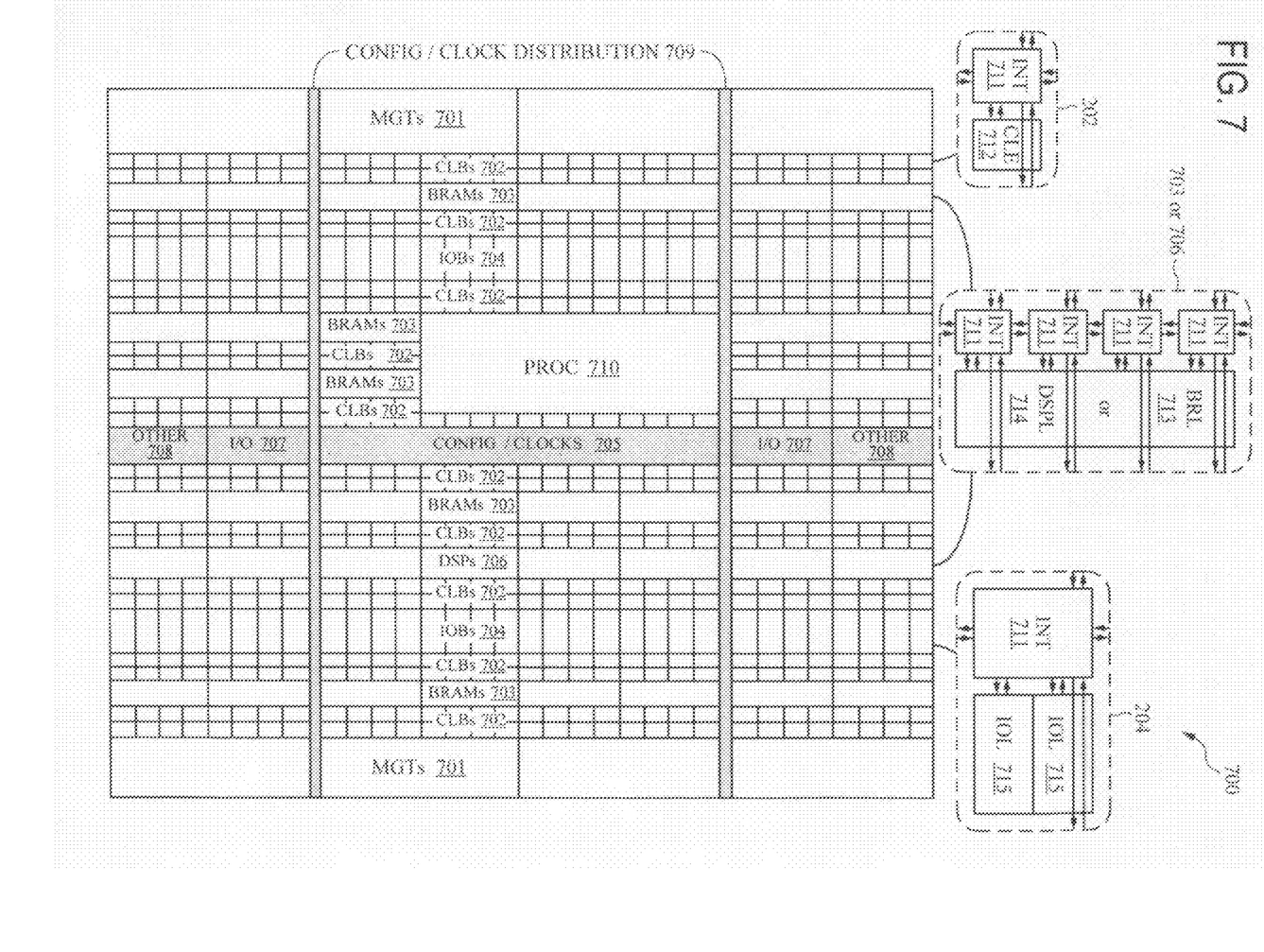
FIG. 7 illustrates a field programmable gate array (FPGA) architecture on which various embodiments of the invention may be implemented.

FIG. 7 illustrates a field programmable gate array (FPGA) architecture 700 on which various embodiments of the invention may be implemented. FPGA 700 includes a large number of different programmable tiles including multi-gigabit transceivers (MGTs 701), configurable logic blocks (CLBs 702), random access memory blocks (BRAMs 703), input/output blocks (IOBs 704), configuration and clocking logic (CONFIG/CLOCKS 705), digital signal processing blocks (DSPs 706), specialized input/output blocks (I/O 707) (e.g., configuration ports and clock ports), and other programmable logic 708 such as digital clock managers, analog-to-digital converters, system monitoring logic, and so forth. Some FPGAs also include dedicated processor blocks (PROC 710).

In some FPGAs, each programmable tile includes a programmable interconnect element (INT 711) having standardized connections to and from a corresponding interconnect element in each adjacent tile. Therefore, the programmable interconnect elements taken together implement the programmable interconnect structure for the illustrated FPGA. The programmable interconnect element (INT 711) also includes the connections to and from the programmable logic element within the same tile, as shown by the examples included at the top of FIG. 7.

For example, a CLB 702 can include a configurable logic element (CLE 712) that can be programmed to implement user logic plus a single programmable interconnect element (INT 711). A BRAM 703 can include a BRAM logic element (BRL 713) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 706 can include a DSP logic element (DSPL 714) in addition to an appropriate number of programmable interconnect elements. An IOB 704 can include, for example, two instances of an input/output logic element (IOL 715) in addition to one instance of the programmable interconnect element (INT 711). As will be clear to those of skill in the art, the actual I/O pads connected, for example, to the I/O logic element 715 are manufactured using metal layered above the various illustrated logic blocks, and typically are not confined to the area of the input/output logic element 715.

In the pictured embodiment, a columnar area near the center of the die (shown shaded in FIG. 7) is used for configuration, clock, and other control logic. Horizontal areas 709 extending from this column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic. For example, the processor block PROC 710 shown in FIG. 7 spans several columns of CLBs and BRAMs.

Note that FPGA 700 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FPGA 700 are purely exemplary. For example, in an actual FPGA more than one adjacent column of CLBs is typically included wherever the CLBs appear, to facilitate the efficient implementation of user logic.

The present invention is thought to be applicable to a variety of systems for profiling computing arrangements. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement for profiling a target system, comprising:
   a first uni-directional, point-to-point bus having a single input port and a single output port;
   a first target processor having a trace port coupled to the input port of the first bus, wherein the first target processor is configured to execute a plurality of instructions one or more times, and to provide state data of the first target processor at the trace port and to the input port of the first bus;
   a second uni-directional, point-to-point bus having a single input port and a single output port, wherein the input port of the second bus is coupled to the trace port of the first processor;
   a profile circuit arrangement coupled to the output port of the first bus; and
   a memory coupled to the profile circuit arrangement,
   wherein the memory includes first and second memories having respective data and address ports; and
   wherein the profile circuit arrangement includes first and second profile core circuits respectively coupled to the output ports of the first and second buses, and respectively coupled to the first and second memories, each of the first and second profile circuits configured to read data from the respective first and second buses on different clock cycles and write the data to the respective memories.

2. The circuit arrangement of claim 1, wherein the state data comprises program counter values from the first target processor.

3. The circuit arrangement of claim 1, wherein the state data comprises cache status data from the first target processor.

4. The circuit arrangement of claim 1, wherein the input ports of the first and second buses are coupled to a first trace port of the first processor, the circuit arrangement further comprising:
   a third uni-directional, point-to-point bus having a single input port and a single output port, wherein the input port of the second bus is coupled to a second trace port of the first processor; and
   a fourth uni-directional, point-to-point bus having a single input port and a single output port, wherein the input port of the fourth bus is coupled to a third trace port of the first processor,
   wherein the memory further includes a third memory having respective data and address ports; and
   wherein the profile circuit arrangement further includes a third profile core circuit respectively coupled to the output port of the fourth bus, and respectively coupled to the third memories, the third profile circuits configured to read data from the fourth bus and write the data to the memory.

5. The circuit arrangement of claim 1, wherein the first target processor is a processor embedded on a field programmable gate array (FPGA).

6. The circuit arrangement of claim 5, wherein the profile circuit arrangement includes a profile processor, and the profile processor is implemented in programmable logic of the FPGA.

7. The circuit arrangement of claim 1, wherein the first bus includes a first-in-first-out (FIFO) buffer having independent write and read control ports.

8. A method for profiling a target processor, comprising:
   configuring a field-programmable gate array (FPGA) with a target processor, a profile circuit arrangement, a first uni-directional, point-to-point bus having a single input port and a single output port, and a memory, wherein the target processor has a first trace port coupled to the input port of the bus, and the profile circuit arrangement is coupled to the output port of the bus and to the memory;
   executing a plurality of instructions one or more times on the target processor;
   presenting state data of the target processor at the trace port as the instructions are executed;
   reading the state data from the first bus by the profile circuit arrangement; and
   writing the state data to the memory by the profile circuit arrangement.

9. The method of claim 8, wherein:
   configuring the FPGA with a uni-directional, point-to-point bus includes configuring the FPGA with a first-in-first-out (FIFO) buffer having independent write and read control ports; and
   the method further comprises writing the state data to the FIFO buffer and reading the state data from the FIFO buffer.

10. The method of claim 8, wherein the state data comprises a program counter value of the target processor.

11. The method of claim 8, wherein the state data comprises a cache status of the target processor.

12. The method of claim 8, wherein the profile circuit arrangement comprises a processor that executes instructions.

13. The method of claim 12, further comprising:
   configuring the FPGA with a second uni-directional, point-to-point bus having a single input port and a single output port, wherein the input port of the second bus is coupled to a second trace port of the target processor;
   configuring the FPGA with a trigger logic circuit coupled to output port of the second bus, wherein the trigger logic circuit is configured to generate an interrupt signal to the processor of the profile circuit arrangement in response to data read from the second bus;
   presenting state data of the target processor at the second trace port as the instructions are executed; and
   reading the state data from the second bus by the trigger logic circuit.

14. The method of claim 8, wherein the profile circuit arrangement includes first and second profile logic circuits, the method further comprising:
   configuring the FPGA with a second uni-directional, point-to-point bus having a single input port and a single output port, wherein the input port of the second bus is coupled to a second trace port of the target processor, the output port of the first bus is coupled to the first profile logic circuit, and the output port of the second bus is coupled to the second profile logic circuit;
   presenting state data of the target processor at the second trace port as the instructions are executed;
   reading the state data from the second bus by the second profile logic circuit; and writing the state data read form the second bus to the memory by the second profile logic circuit.

15. An apparatus for profiling a target processor, comprising:
- a plurality of uni-directional, point-to-point buses, each having a respective single input port and a respective single output port, wherein the target processor has a plurality of trace ports coupled to respective input ports of the buses, is configured to execute a plurality of instructions one or more times, and provides state data of the target processor at the plurality of trace ports;
- a plurality of memories having respective data and address ports;
- first means for reading state data from a respective one of the plurality of uni-directional, point-to-point buses and for storing state data read from the respective one of the buses in a respective one of the plurality of memories;
- second means for reading state data from a respective one of the plurality of uni-directional, point-to-point buses and for storing state data read from the respective one of the buses in a respective one of the plurality of memories; and
- wherein the first means and second means are configured to read data from the respective buses on different clock cycles.

* * * * *